United States Patent [19]

Seaburg

[11] 3,867,659

[45] Feb. 18, 1975

[54] BRUSH HOLDER ASSEMBLY

[75] Inventor: Duane M. Seaburg, Oakfield, N.Y.

[73] Assignee: General Electric Company, New York, N.Y.

[22] Filed: Aug. 6, 1973

[21] Appl. No.: 386,154

[52] U.S. Cl. ............................................... 310/242
[51] Int. Cl. ............................................ H02k 13/00
[58] Field of Search .......... 310/239, 240, 242, 245, 310/246, 247, 219, 42, 229, 238, 241

[56] References Cited
UNITED STATES PATENTS

| | | | |
|---|---|---|---|
| 3,466,481 | 9/1969 | Sckerl | 310/239 |
| 3,525,891 | 8/1970 | Lukawich | 310/239 |
| 3,577,025 | 5/1971 | Kingsburry | 310/239 |
| 3,656,018 | 4/1972 | Maher | 310/242 |
| 3,784,856 | 1/1974 | Preston | 310/239 |

Primary Examiner—R. Skudy
Attorney, Agent, or Firm—John F. Cullen; George R. Powers; Leonard J. Platt

[57] ABSTRACT

An improved brush holder assembly comprising a motor frame with longitudinal groove means completely open at the top. Channel means in the groove sides terminates below the groove top to form an overhang. A tubular brush holder means with flexible lances opening upwardly allows the holder to be pressed down from above against the groove bottom with the lances locking below the overhang to locate and lock the holder in all directions for easier manual or automatic assembly.

6 Claims, 4 Drawing Figures

PATENTED FEB18 1975

3,867,659

BRUSH HOLDER ASSEMBLY

BACKGROUND OF THE INVENTION

1. Field of the Invention

The invention pertains to a brush holder assembly as used in an electric motor frame for easy automatic assembly whereby the brush holder may be pressed down against a stop which forms its receptacle and then automatically locks itself in position against motion in three planes.

2. Description of the Prior Art

Many types of brush holder assemblies have been devised for different specific applications and these have generally been directed to easily removable assemblies or to improvements of individual parts to reduce the cost and number of parts in order to adapt it for machine assembly as opposed to manual assembly. Various devices have been proposed, such as snap clamps or clips, to hold the brush back in the brush holder so that it does not interfere or strike the commutator until it is in position thus permitting its assembly as a subassembly. One form that has successfully overcome the inherent tendency of the outwardly-biased brush from interfering with the commutator during assembly or replacement is shown in the U.S. Pat. No. 3,656,018 and an alternate and generally improved version of that structure is disclosed in now, U.S. Pat. No. 3,784,856 both of common assignment, and both directed to means to retain the brush within the holder. The present invention is a generally improved version of brush holder assembly that may be applied to either of the above.

SUMMARY OF THE INVENTION

Briefly described, the invention is provided for use in an electric motor frame employing commutator brushes and forms an improved brush holder assembly comprising substantially rectangular groove means molded in the frame and having a complete open top with the groove having channel means in the sides thereof extending towards and terminating below the top of the groove to define a distinctive overhang below the top. A tubular brush holder formed to fit the groove and insertable directly down from above to bottom in the groove and locate itself, is provided with flexible tabs or lances extending outwardly from and opening upwardly on each side of the brush holder. The channel means and lances are of less extent than the width of the groove and holder so that the holder may be automatically pressed down from the top to bottom in the groove. A tab means deflects into the channels to lock below the overhang and locate and fix the holder in the groove in several planes. Any suitable brush holding retaining means as disclosed in the noted patent or application of common assignment may be used with this combination. Thus, the main object is to provide an improved brush holder assembly that uses few parts, lends itself to easy automation, and uses only the parts themselves to lock and locate the brush holder permanently in position.

DESCRIPTION OF THE PREFERRED EMBODIMENT

While the invention is applicable to any brush holder assembly, regardless of its shape, it will be convenient to describe it in the more common rectangular shape as shown and used on many motors.

Figure 1:
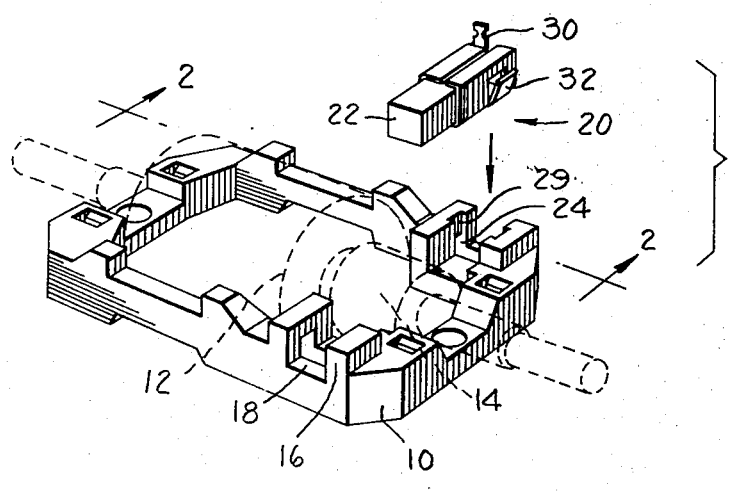
FIG. 1 is a partial perspective view of a typical motor frame showing a brush holder assembly removed for convenience.

Referring to FIG. 1, there is shown an electric motor frame 10 designed to support a rotating armature 12 with the usual commutator 14. The frame may be of any material, such as an insulated die casting or preferably molded plastic, and is supplied with brush holder means such as upstanding holder lugs 16 having grooves 18 completely open at the top and extending through the frame as shown for the reception of a brush holder assembly generally indicated at 20. In assembly of such electric motors, whether by automated machinery or manual labor, it is desired to accurately locate the brush holder 20 with or without its internal carbon brush 22 and to do it easily. In the case of automatic assembly for which the present invention is primarily designed, it is easier for automatic machinery to push down from above against a stop as opposed to pushing in from the side and for this reason the grooves 18 have a complete open top in the frame as shown. While the grooves 18 and brush holder 20 may be any suitable shape, generally they are substantially rectangular in cross section as shown.

In order to positively locate and fix the brush holder 20 in the grooves 18, the frame 10 and grooves 18 are, in the case of a plastic molding, formed with vertical channels 24 in the opposite sides of the groove and these channels extend towards the open top but terminate short of the top of the groove to define an overhand 26. To ensure a snug fit of the brush holder and limit the tolerances required, the overhang is preferably slanted at 28 for a purpose to be explained. To cooperate with the groove, tubular brush holder 20 may be economically bent from a flat strip of flexible brass and thus split lengthwise as shown and formed with end walls and electrical terminals 30 bent out of the holder. The brush holder 20 is formed to fit groove 18. To lock it therein, suitable tab means or lances 32 may be struck out of the sides of the brush holder to extend outwardly from the brush holder and open upwardly thereof when the holder is in its fixed position as shown in FIGS. 2 and 3.

Figure 2:
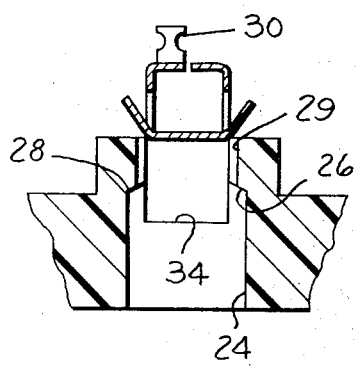
FIG. 2 is an enlarged cross-sectional view on line 2—2 of FIG. 1 showing the brush holder before insertion in the frame.
Figure 3:
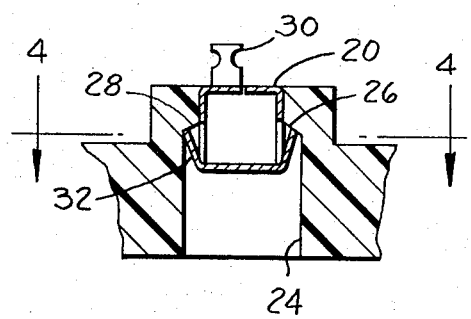
FIG. 3 is a view, similar to FIG. 2 of a slightly modified form, showing the brush holder locked in position.

With this simply formed brush holder and open groove in the motor frame, it will be apparent that the brush holder may be inserted from the top, as shown in FIG. 2, and merely pressed down from above against the bottom 34 of the groove whereupon the lances 32 are flexibly depressed into the side of the holder to snap out fish-hook like into channels 24 to lock below the overhang 26 along the slanted wall 28 as shown in FIG. 3, thus locating and fixing holder 20 in groove 18 in all directions or three planes. The slanted wall 28 assists in firmly locking the tabs for a tight fit, substantially regardless of the tolerance of the box and holder and the tabs may jam anywhere along the slant 28 as shown at different locations in FIG. 3. Practically, the slant angle is less than the arc of the tab as it springs out so it always jams on the slanted wall for a tight fit. By making the vertical channels 24 and lances 32 of substantially the same width and of lesser extent than the width of the holder 20 or groove 18, it will be apparent that the holder is firmly locked in position against longitudinal movement as clearly shown in FIG. 4. For manual assembly, it may be convenient to mold an offset 29 into the groove side or upper part of channel 24 to horizontally assist locating the brush holder 20 as shown in FIGS. 1 and 2. Since machine assembly is more exact, the offset may be omitted as in FIG. 3. In either case, the parts are not subject to close tolerances normally required. Additionally, the holder is firmly locked against vertical movement by the spreading of lances 32 as shown in FIG. 3. This arrangement permits the bottom 34 of the groove 18 itself to be used as a stop to firmly locate the holder in position and the insertion from directly above lends well to automation since it merely lays down parts and pushes them in from above.

Figure 4:
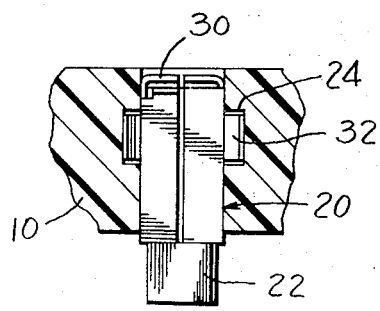
FIG. 4 is a partial view from above taken on the line 4—4 of FIG. 3.

It should be noted that the motor frame has much less molding complexity since the grooves 18 are completely open at the top and are thus easily formed because there is no need for material to flow around any spanning bridge work and the molding is straightforward. The brush holder 20 is completely uncomplicated having only two opposite tabs or lances as opposed to many projections in previous constructions and there are substantially no critical tolerances on the holder since the tabs 32 can be bent out at almost any angle and are quite flexible when bent out as shown and they firmly lock under the overhang 26 and against slanted wall 28. With the positive stop at the bottom of the groove, the device lends itself to automatic assembly and the entire assembly is rigid after it has been pressed into position since the holder is biased down against the bottom of the groove and locked against longitudinal movement by the extended tabs in the vertical channels. This present simplified brush holder assembly lends itself to any suitable means of retaining the brush in the holder such as shown in the aforementioned patents and the brushes in FIGS. 1 and 4 are illustrative only.

While there have been described preferred forms of the invention, obvious equivalent variations are possible in light of the above teachings. It is therefore to be understood that, within the scope of the appended claims, the invention may be practised otherwise than as specifically described, and the claims are intended to cover such equivalent variations.

I claim:

1. For use in an electric motor frame with commutator brushes, an improved brush holder assembly comprising, groove means having a complete open top disposed in said frame, channel means in the side of said groove means extending towards and terminating below the top of the groove to define an overhang below said top, a tubular brush holder formed to fit said groove means, flexible tab means comprising lances struck out of the sides of the brush holder and opening upwardly of the fixed position of said brush holder, whereby said holder may be pressed down from above against the groove bottom with the tab means deflecting into the channel means and then locking below the overhang to locate and fix the holder in the groove.

2. Apparatus as described in claim 1 wherein said groove is substantially rectangular in cross section and the opposite sides each have vertical channel means disposed therein.

3. Apparatus as described in claim 2 wherein said tubular holder is rectangular for pressing in said groove and said flexible tab means comprises lances struck out of the sides of the holder.

4. Apparatus as described in claim 3 wherein said overhang is a slanted wall.

5. Apparatus as described in claim 3 wherein the angle of said slanted wall is less than the arc described by said lances as they lock below said overhang whereby a tight fit is obtained.

6. Apparatus as described in claim 4 wherein the motor frame is molded plastic and the vertical channels and lances are of substantial equal width as part of said groove and holder, respectively.

* * * * *

UNITED STATES PATENT OFFICE
CERTIFICATE OF CORRECTION

PATENT NO. : 3,867,659
DATED : February 18, 1975
INVENTOR(S) : Duane M. Seaburg

It is certified that error appears in the above-identified patent and that said Letters Patent are hereby corrected as shown below:

Column 2, line 43 "hand 26" should be -- hang 26--;

Column 3, line 40, "extended" should be -- expanded --;

Column 4, line 37, claim 5 should be dependent on claim 4;

line 41, claim 6 should be dependent on claim 5;

Signed and sealed this 20th day of May 1975.

(SEAL)
Attest:

RUTH C. MASON
Attesting Officer

C. MARSHALL DANN
Commissioner of Patents
and Trademarks